(12) United States Patent
Alpert (10) Patent No.: US 9,517,681 B2
(45) Date of Patent: Dec. 13, 2016

(54) APPARATUS AND METHOD FOR RADIANT HEATING AND COOLING FOR VEHICLES

(76) Inventor: Martin A. Alpert, Beachwood, OH (US)

(*) Notice: Subject to any disclaimer, the term of this patent is extended or adjusted under 35 U.S.C. 154(b) by 664 days.

(21) Appl. No.: 12/854,482

(22) Filed: Aug. 11, 2010

(65) Prior Publication Data

US 2011/0042988 A1    Feb. 24, 2011

Related U.S. Application Data

(60) Provisional application No. 61/235,771, filed on Aug. 21, 2009.

(51) Int. Cl.
*B60H 1/00* (2006.01)
*B60H 1/22* (2006.01)

(52) U.S. Cl.
CPC .................. *B60H 1/2218* (2013.01)

(58) Field of Classification Search
CPC ....... B60H 1/22; B60H 1/2215; B60H 1/2218; B60H 1/2225; B60H 1/00478; B60H 1/32; B60H 1/005; F25B 21/02
USPC ..... 219/202; 237/12.3 A, 12.3 B, 12.6, 12.7; 392/407; 165/104.19; 62/241, 310, 3.61, 62/239, 244
See application file for complete search history.

(56) References Cited

U.S. PATENT DOCUMENTS

| | | | |
|---|---|---|---|
| 2,519,109 A * | 8/1950 | Callender | 236/91 R |
| 3,964,268 A * | 6/1976 | DiPeri | 62/121 |
| 4,662,561 A | 5/1987 | Dietzsch et al. | |
| 4,920,759 A * | 5/1990 | Tanaka | B60H 1/00478 165/203 |
| 4,962,825 A * | 10/1990 | Albright et al. | 180/292 |
| 6,454,178 B1 * | 9/2002 | Fusco et al. | 236/49.3 |
| 6,843,426 B2 * | 1/2005 | Isaacson | 237/12.3 B |
| 7,102,308 B2 * | 9/2006 | Lacey et al. | 318/268 |
| 7,248,790 B2 * | 7/2007 | Misumi et al. | 392/420 |
| 7,254,953 B2 * | 8/2007 | Callas et al. | 62/3.7 |
| 7,682,233 B2 * | 3/2010 | Wang et al. | 454/160 |
| 8,252,174 B2 * | 8/2012 | Jones et al. | 210/149 |
| 2004/0065101 A1 * | 4/2004 | Krupp et al. | 62/244 |
| 2004/0195344 A1 * | 10/2004 | Isaacson | 237/12.3 B |
| 2007/0215589 A1 * | 9/2007 | Berger | 219/202 |
| 2008/0069689 A1 * | 3/2008 | Sun et al. | 415/203 |
| 2008/0264602 A1 * | 10/2008 | Newberry | 165/56 |
| 2009/0000778 A1 * | 1/2009 | Nathan et al. | 165/202 |
| 2009/0139973 A1 * | 6/2009 | Hung | 219/202 |
| 2009/0199572 A1 * | 8/2009 | Klein et al. | 62/3.61 |
| 2010/0080399 A1 * | 4/2010 | Pfau et al. | 381/71.4 |
| 2010/0176110 A1 * | 7/2010 | Ogino et al. | 219/202 |
| 2011/0269388 A1 * | 11/2011 | Meulenbelt | 454/76 |

FOREIGN PATENT DOCUMENTS

JP          08011517 A  *  1/1996  ............... B60H 1/00

* cited by examiner

*Primary Examiner* — Steven B McAllister
*Assistant Examiner* — Ko-Wei Lin
(74) *Attorney, Agent, or Firm* — Renner, Otto, Boisselle & Sklar, LLP (57) ABSTRACT

The passenger compartment of a vehicle, e.g., an automobile or other automotive vehicle, train, aircraft or watercraft, is heated or cooled using radiant heating or radiant cooling. As another option the automobile or other vehicle is heated using a low velocity blower.

18 Claims, 7 Drawing Sheets

APPARATUS AND METHOD FOR RADIANT HEATING AND COOLING FOR VEHICLES

CROSS-REFERENCE TO RELATED APPLICATION

This application claims the benefit of U.S. Provisional Patent Application Ser. No. 61/235,771, filed Aug. 21, 2009, the entire disclosure of which is hereby incorporated by reference.

TECHNICAL FIELD

The present invention relates generally to radiant heating and/or cooling in vehicles, and, more particularly, as indicated, to apparatus and method for radiant heating and cooling for vehicles.

BACKGROUND

Many vehicles have heating systems and cooling systems, respectively, to heat and to cool the passenger area of the vehicle. Vehicles include, for example, automobiles, aircraft, watercraft, trains, buses, etc. Various systems have been used to heat and/or to cool vehicles. The systems typically include a blower that blows air across a heat exchanger. The operating blower makes noise and the airflow makes noise. Such noise adds to the noise occurring as a result of traveling, for example, such as the noise from airflow (or water flow) across the exterior of the vehicle, the noise of the vehicle engine(s), road noise as wheels roll across a highway, track, and so on.

Many vehicles now have built-in high quality players, such as, for example, radios, tape drives, disc drives (such as compact disc (CD) or other type discs), etc., to play desired sounds, e.g., music, shows, etc. in the vehicle. Sometimes a person may bring such a player into the vehicle to listen to music, shows, etc. Although vehicles may be insulated with respect to the transmitting of noise external of the vehicle to the interior of the vehicle, such insulation does not block blower noise and blown air flow noise as a conventional blower system blows air across a heat exchanger into a vehicle for heating or cooling purposes, for example. That additional noise may detrimentally affect the quality of sounds played from the player. Such noise also detrimentally affects telephone conversations, instructions from a GPS, etc. and also conversations between passengers.

SUMMARY

Briefly, according to an aspect a vehicle may be heated and/or cooled using radiant heating and/or cooling.

According to another aspect, such radiant heating and/or cooling is provided without blowing air flow.

Another aspect relates to a vehicle, including a passenger or user compartment, and a radiant system configured to provide at least one of heating or cooling in the passenger compartment.

According to one or more other aspects,
the radiant system includes a radiant heater;
the radiant system includes an infrared heater;
the radiant system includes an infrared energy emitting lamp;
the radiant system includes resistance heating wires;
the radiant system includes infrared energy emitting wires configured to emit infrared energy in response to electrical energization;
the radiant system includes a solid state heater;
the radiant system includes a coupling to receive heated fluid from an engine of the vehicle;
the radiant system includes a radiant cooler;
the radiant system includes a solid state cooling device;
the radiant system includes a coupling to receive refrigerant from a refrigerant compressor of the vehicle;
the radiant system includes resistance heating wires;
the radiant system includes a cooling plate;
the radiant system includes a solid state semiconductor cooling device;
the radiant system emits heating and/or cooling effect or energy in the passenger compartment;
the radiant system emits heating and/or cooling to heat and/or to cool the entire passenger compartment of the vehicle;
the system further includes a control configured to control heating and/or cooling by the radiant system;
the passenger compartment has a floor area, and the radiant system is at or in the floor area;
the passenger compartment has a ceiling area, and the radiant system is at or in the ceiling area;
the passenger compartment has doors, and the radiant system is at or in one or more doors;
the passenger compartment has a front and a back, and the radiant system is at or in front and/or the back;
the passenger compartment has a front, e.g., including a dashboard, and the radiant system is at or in the front;
the passenger compartment has seats, and the radiant system is in one or more seats, e.g., in the back of the seats or elsewhere;
the radiant system is operative to provide effective heating of the passenger compartment without a blower in the passenger compartment; and/or
the radiant system is operative to provide effective cooling of the passenger compartment without a blower in the passenger compartment.

According to another aspect, a radiant system for a vehicle that has a passenger compartment, includes a radiant energy emitter, and a connection to the radiant energy emitter to provide energy thereto to provide at least one of heating or cooling in the passenger compartment by the radiant energy emitter; additionally or alternatively the radiant system may include a radiant energy absorber for cooling.

According to one or more further aspects,
the radiant system includes a radiant heater;
the radiant system includes an infrared heater;
the radiant system includes an infrared energy emitting lamp;
the radiant system includes resistance heating wires;
the radiant system includes infrared energy emitting wires configured to emit infrared energy in response to electrical energization;
the radiant system includes a solid state heater;
the radiant system includes a coupling to receive heated fluid from an engine of the vehicle;
the radiant system includes a radiant cooler;
the radiant system includes a solid state cooling device;
the radiant system includes a coupling to receive refrigerant from a refrigerant compressor of the vehicle;
the radiant system includes resistance heating wires;
the radiant system includes a cooling plate;
the radiant system includes a solid state semiconductor cooling device;
the radiant system emits heating and/or cooling effect or energy in the passenger compartment;

the radiant system emits heating and/or cooling to heat and/or to cool the entire passenger compartment of the vehicle;

the system further includes a control configured to control heating and/or cooling by the radiant system;

the passenger compartment has a ceiling area, and the radiant system is at or in the ceiling area;

the passenger compartment has a floor area, and the radiant system is at or in the floor area;

the passenger compartment has a floor area, and the radiant system is at or in the floor area;

the radiant system is operative to provide effective heating of the passenger compartment without a blower;

the radiant system is operative to provide effective cooling of the passenger compartment without a blower;

the vehicle is an automotive vehicle;

the vehicle is a bus;

the vehicle is a train;

the vehicle is an aircraft; and/or the vehicle is a watercraft.

According to another aspect a method of heating and/or cooling in a vehicle, includes providing heating or cooling effect by radiating heat or radiating cooling or providing absorbing to absorb heat.

According to one or more further aspects, the radiating including radiating heat or cooling in a compartment of the vehicle;

the providing including using radiant heating or radiant cooling as the sole source of heating or cooling, respectively of the vehicle;

the method further includes providing appropriate energy to a radiant energy radiating or emitting device to provide heating or cooling effect by radiating heat or radiating cooling;

the energy providing step includes providing electrical energy to a radiant heating device;

the energy providing step includes providing electrical energy to a radiant cooling device;

the energy providing step includes providing warm fluid to a heat radiating device;

the energy providing step includes providing chilled fluid, refrigerant, expandable to cool fluid, or phase change fluid to a cooling radiating device;

the method further includes thermostatically controlling temperature in the vehicle;

the thermostatically controlling temperature including sensing temperature in the vehicle, and turning on, turning off, increasing, or decreasing the heat radiating or cooling radiating; and/or the radiant energy is provided without blowing the radiant energy. Alternatively or additionally the controlling may be manually controlling.

According to another embodiment heated air or cooled air may be blown into or otherwise provided into the passenger compartment (or elsewhere) in a vehicle for heating or cooling the same; and the flow of air is provided at a relatively slow speed to tend to avoid noise or to minimize noise caused by air flow in the vehicle and/or by the blower mechanism. The heated or cooled air may be provided by any of the mechanisms described herein and/or by other mechanisms.

According to another aspect, heating and/or cooling of a vehicle is provided silently.

According to another aspect, heating and/or cooling of a vehicle is provided silently using radiating heating and/or cooling.

These and further aspects and features of the invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments. Moreover, in the drawings, like reference numerals designate corresponding parts throughout the several views and Figures.

DESCRIPTION

Figure 1:
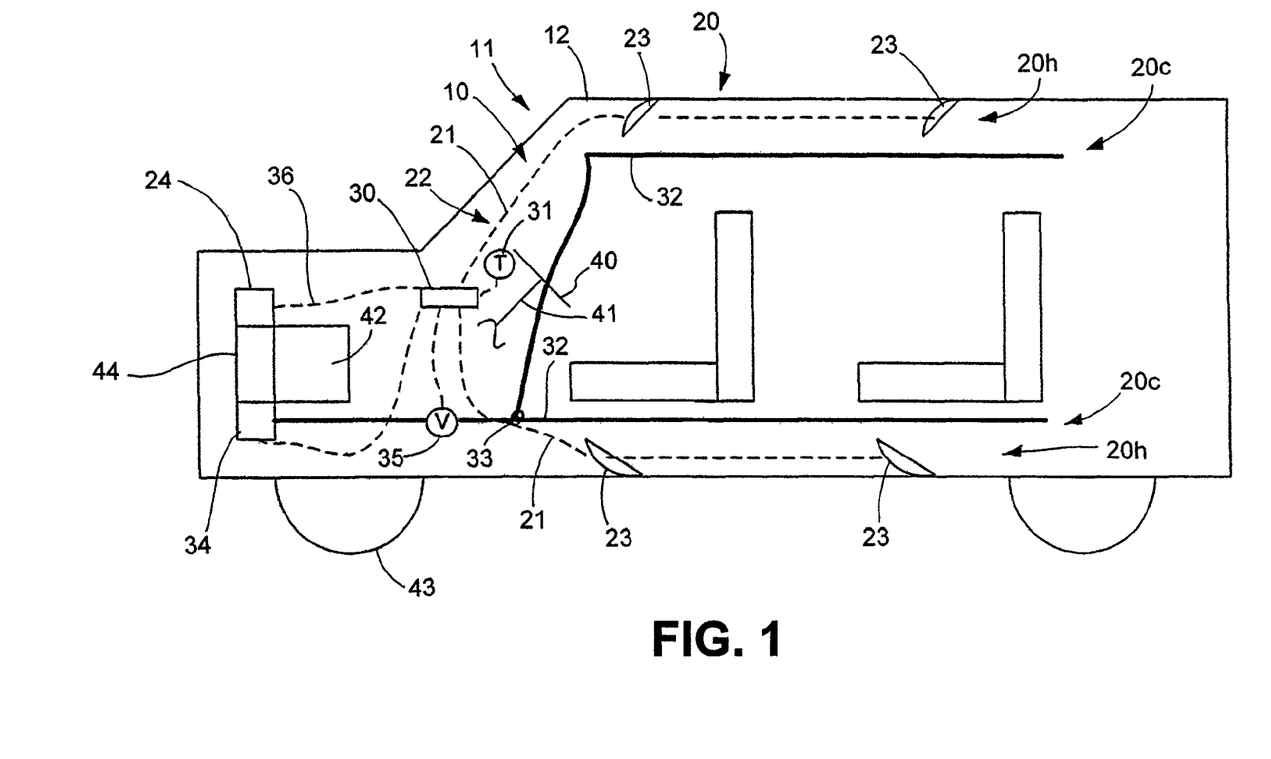
FIG. 1 is a schematic illustration of a radiant system to provide heating and cooling in an automotive vehicle.
Figure 2A:
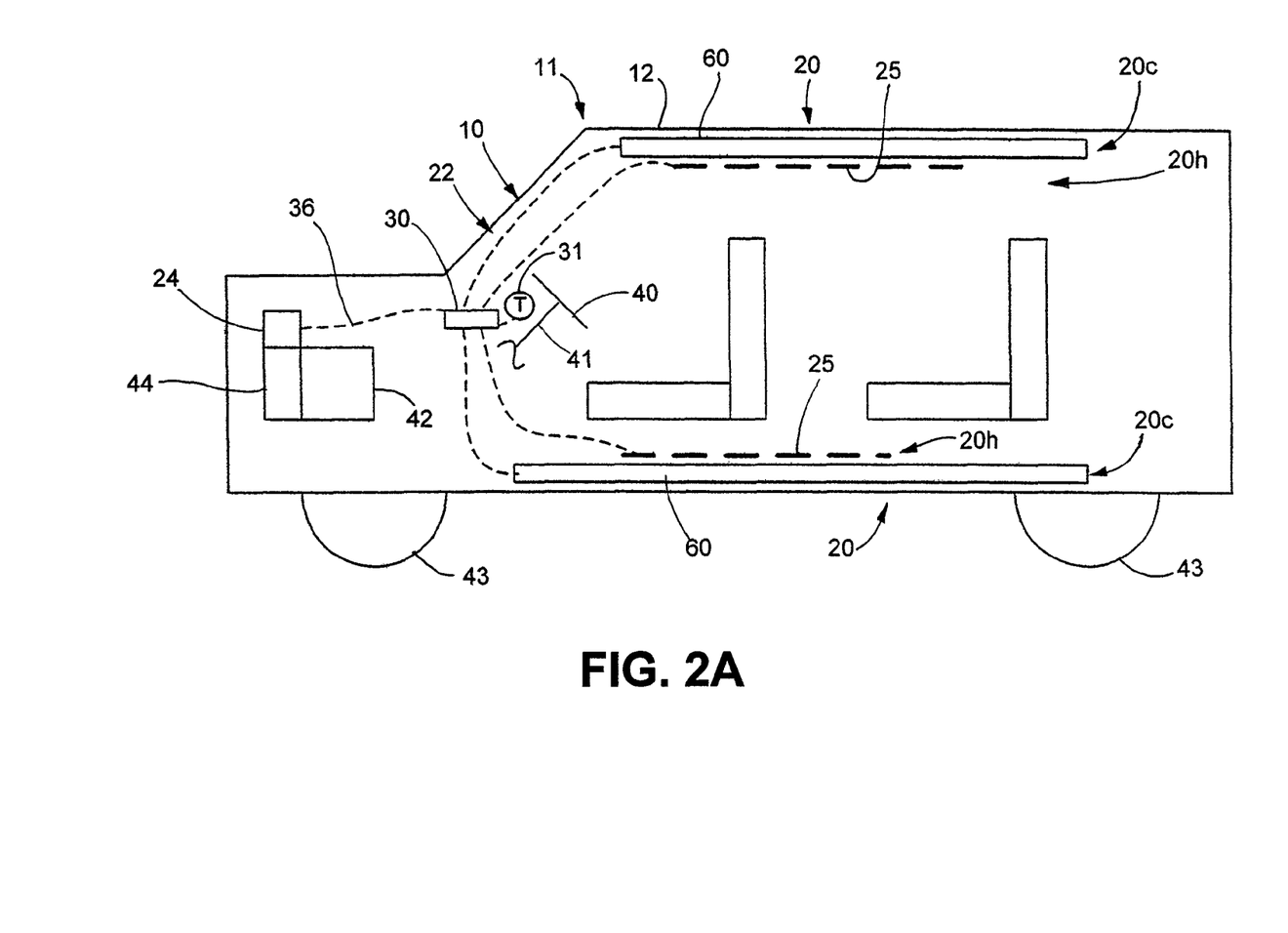
FIG. 2A is a schematic illustration of another embodiment of radiant system to provide heating and/or cooling in an automotive vehicle.
Figure 2B:
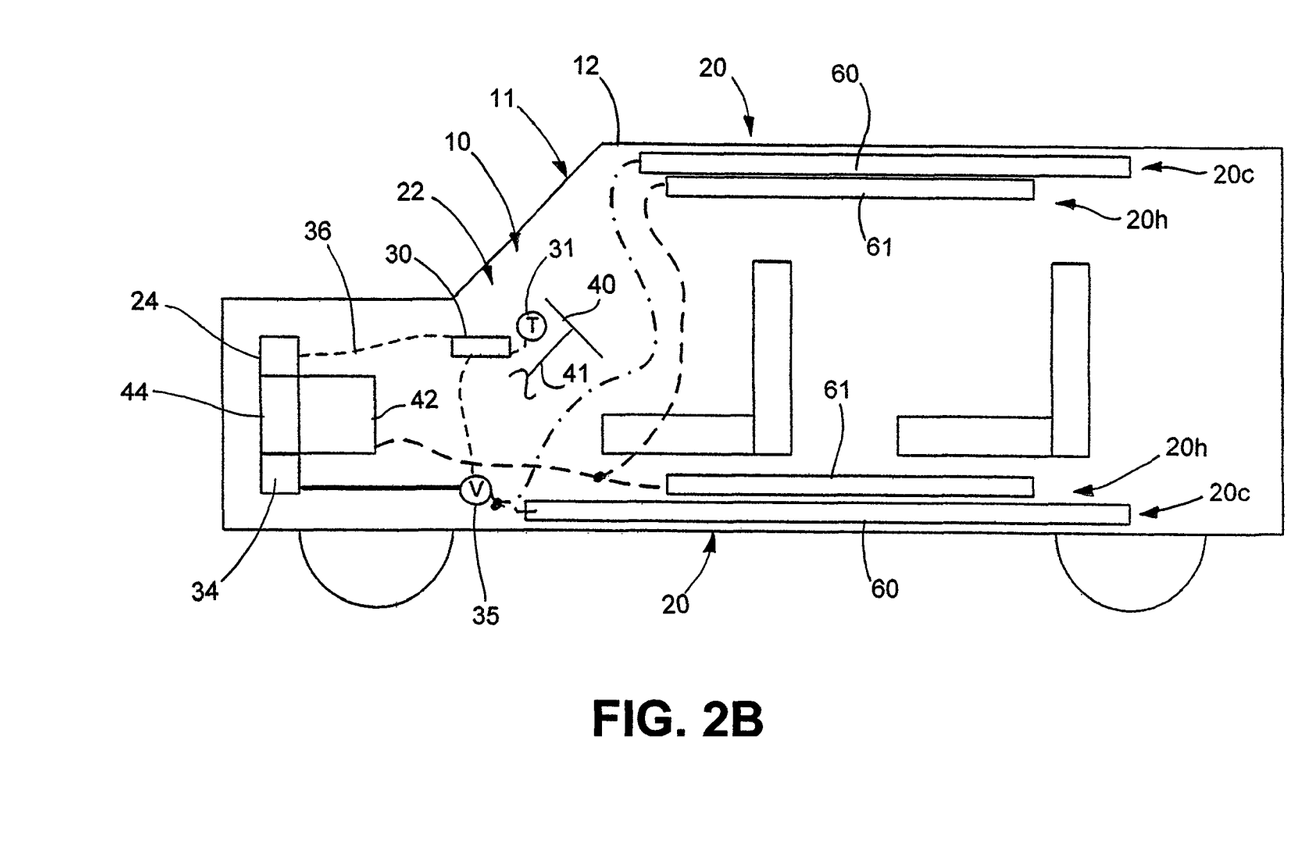
FIG. 2B is a schematic illustration of another embodiment of radiant system to provide heating and/or cooling in an automotive vehicle.

Referring in detail to the drawings, wherein like reference numerals designate like parts in the several Figures, and initially to FIG. 1, a radiant system in accordance with an embodiment of the invention is generally indicated at 10 used in a vehicle 11. The vehicle 11 may be in the form of an automotive vehicle 12, such as an automobile, for example, as is illustrated schematically in FIGS. 1 and 2.

Figure 3:
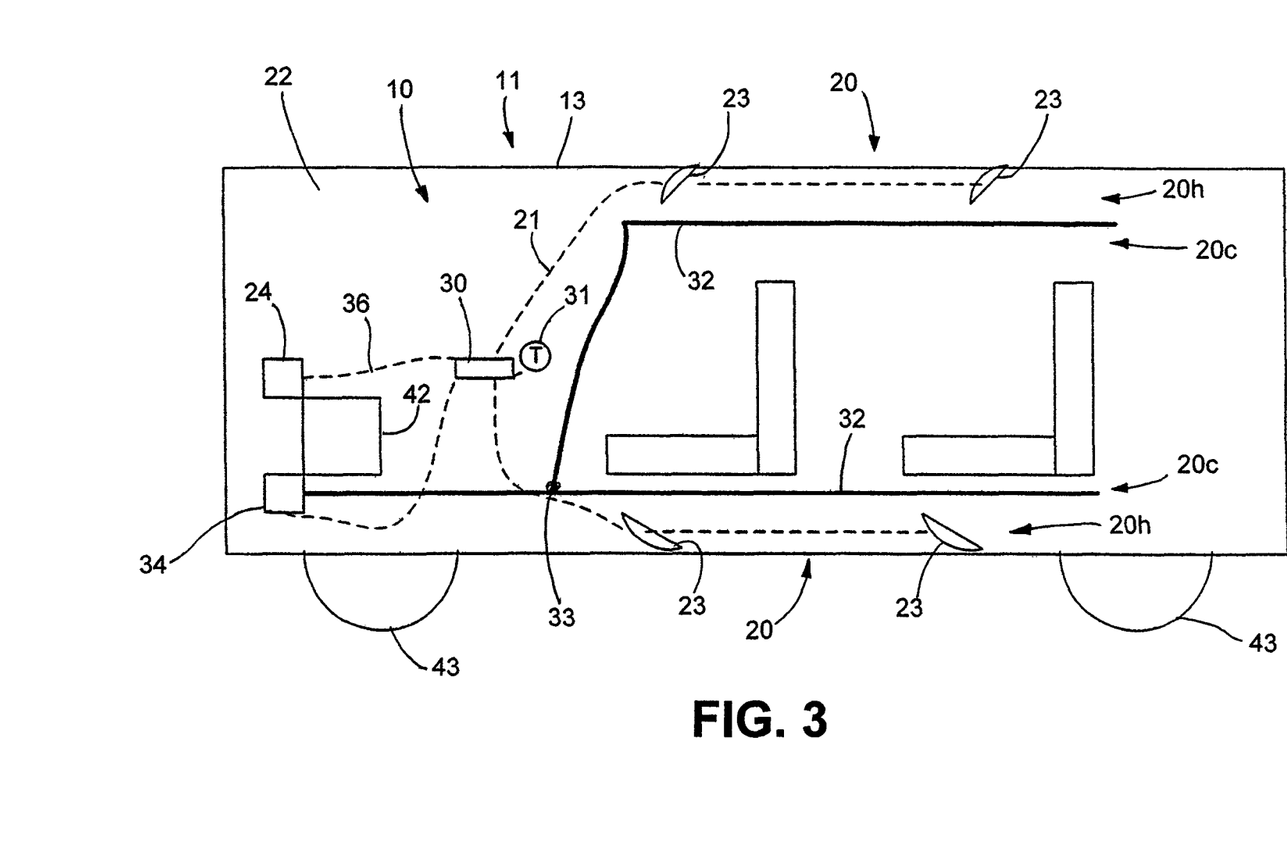
FIG. 3 is a schematic illustration of a radiant system providing heating and/or cooling in a vehicle, such as a train, which may be a passenger train, subway, rapid transit train, etc.
Figure 4:
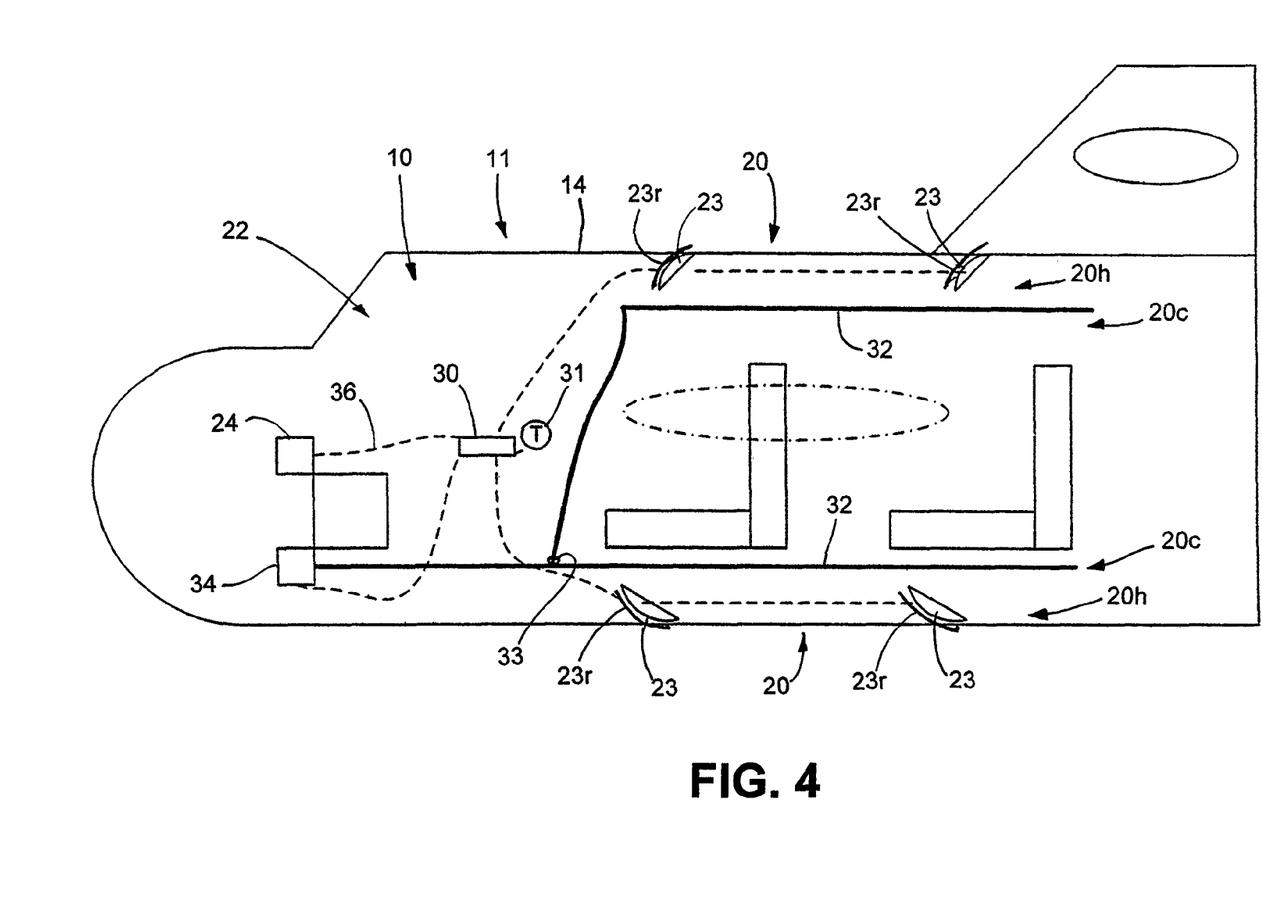
FIG. 4 is a schematic illustration of a radiant system to provide heating and cooling in an aircraft.
Figure 5:
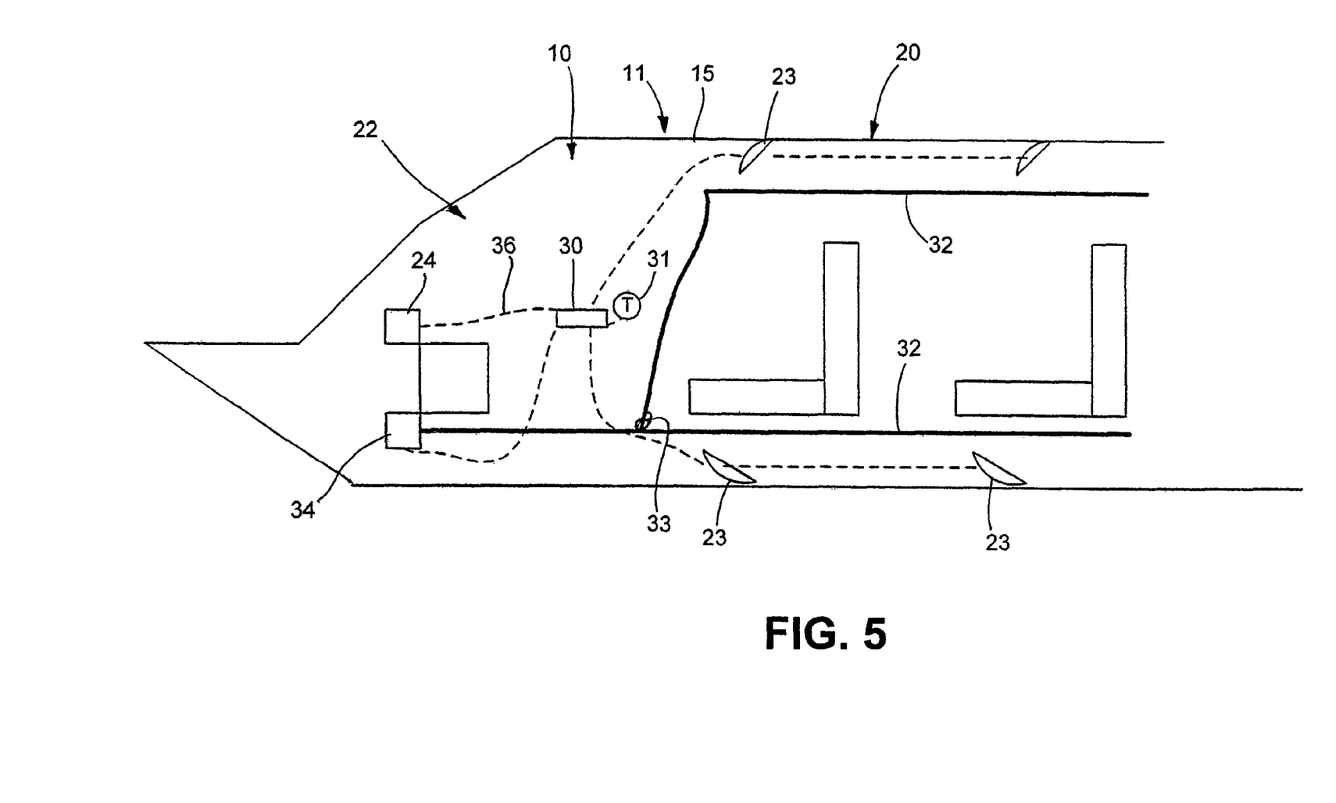
FIG. 5 is a schematic illustration of a radiant system providing heating and cooling in a watercraft.

According to another embodiment, which is shown in FIG. 3, the radiant system 10 may be used in another vehicle 13 in the form of a train, or train car, railroad car, passenger car, freight car, engine, caboose, etc. associated with railroading. The train car 13 may be a subway car, rapid transit car, or some other similar type of vehicle that, for example, operates on rails or in a manner similar to a vehicle that operates on rails. In FIG. 4 the radiant system 10 is illustrated schematically in a vehicle 11 in the form of an aircraft 14. The aircraft may be any type of aircraft, such as, for example, an airplane, helicopter, etc. In FIG. 5 the radiant system 10 is illustrated in a vehicle 11 in the form of a watercraft 15.

The several embodiments of the vehicle illustrated at 12 through 15 in FIGS. 1-5 are exemplary. It will be appreciated that the radiant system 10 may be used in other vehicles, too.

Referring to FIG. 1, the radiant system 10 includes a radiant energy emitter 20 (also referred to as a radiant heater, radiator or radiating device) and an electrical connection 21 to the radiant energy emitter to provide energy thereto, and in response to such energy the radiant energy emitter provides radiant heating and/or radiant cooling at least one of to provide heating or cooling for a compartment 22 of the vehicle 11 and/or to absorb heat. The compartment 22 may be, for example, a passenger compartment, a freight carrying compartment or some other compartment or area of the vehicle 11.

As it is illustrated in FIG. 1 and also in the other drawing Figures, the radiant energy emitter 20 includes a number of radiant energy emitters. For example, as part of the radiant system 10 to heat the compartment 22, the radiant energy emitter 20 includes a radiant heating portion 20h and a radiant cooling portion 20c. The radiant heating portion 20h may include a number of radiant heat emitters 23. Four such emitters are illustrated in FIG. 1, but it will be appreciated that the number of such emitters 23 may be more or fewer than four of them. The radiant heat emitters 23 may be, for example, infrared heaters that provide infrared (heat) energy output in response to an appropriate input. Exemplary input may be electrical input provided by electrical connection 21 from an electrical power source 24 associated with the vehicle 11, such as, for example, the vehicle battery, alternator, generator, or some other source of electrical power. In an example the electrical power may be provided by electrical connection to overhead electrical lines or to railroad tracks, etc., as may be the case in electrified railroad systems, such as may be used in connection with the train car shown in FIG. 3. Other sources of electrical power may be provided to supply electrical energy to the radiant heat emitters 23. If desired, the radiant heat emitters may be of the gas combustion type, and the source of energy to them may be a gas supply.

The radiant heat emitters 23 may be, for example, one or more infrared energy emitting lamps. The radiant heat emitters 23 may be, for example, electric resistance heating wires that emit infrared or heat energy in response to receiving electrical input. An example of infrared energy emitting wires is illustrated at 25 in FIG. 2A. As another example, a radiant heat emitter may be a solid state heater that emits heat in response to electrical energization.

A radiant heater, in contrast to warm air systems that blow air across heat exchangers or the like, delivers heat directly to an area or to an object. For example, a radiant heater may be in the floor, seat, side wall, front, back, and/or ceiling of a vehicle or in the front, side, or back doors of a vehicle, and may provide heat to the vehicle. The radiant heater may be mounted in a space to radiate heat into the space. Reflectors may be used to reflect heat to specified areas in the space. Radiant energy is pure radiation in that it is absorbed by an object without physical contact between the heat source and the object or by heating the surrounding air and/or directing the heat to the object, e.g., a person, part of the vehicle, etc. Various types of radiant heaters are available, some examples of which are described below, and many others of which are well known in the art. Radiant heat may directly warm people and objects in the area (or volume) in the passenger compartment or elsewhere of a vehicle without the source of radiant energy touching the people. Since radiant heat does not necessarily require a blower in the passenger compartment, the noise mentioned above due to operation of a blower and due to the flowing of air in an airflow type heating or cooling system is avoided. Thus, radiant heat may be provided without blowing air or other fluid across the radiant energy producing device.

As is illustrated in FIG. 1, the radiant system 10 also includes a control 30 that controls the operation of the radiant system. The control 30 may be an electrical control system that controls the providing of electrical energy via connections 21 to energize the radiant heat emitters 23 to provide radiant energy, e.g., heat or infrared energy output. The control 30 may be a computer control that can be set and/or programmed by the vehicle operator, user or passenger to provide a desired temperature level in the compartment 22 and/or the intensity of the radiant energy that is directed to one or more passengers in the vehicle compartment 22. The control 30 may include separate controls to operate different respective radiant heat emitters 23 so that individual passengers may control the temperature and/or intensity of radiant heat provided in the area where they are located, e.g., seated, in the vehicle. The control 30 may include one or more temperature sensors 31, e.g., thermostats, thermocouple devices, bimetal devices, etc., to sense the temperature in the compartment 22 or at respective areas in the compartment 22 to provide an input to the control for use in automatically adjusting the operation of radiant heat emitters 23, for example.

Throughout the drawings relatively light weight dash lines represent electrical connections for electrical power and/or for electrical monitoring and/or control signals for the various components that are described herein.

The radiant system 10 also includes a radiant cooler 20c. The radiant cooler may include pipes, surfaces, etc. that radiate cooling in the compartment 22. As an example, the radiant cooling portion 20c may include a number tubes or pipes 32 that have a connection 33 to a refrigerant compressor, chiller, etc. 34 (referred to below solely as compressor for brevity). The refrigerant compressor 34 may be a conventional compressor of the type used in a vehicle air conditioning system; it may be another type of chiller type of device that chills refrigerant or coolant, such as a conventional refrigerant typically used in a vehicle air conditioning system or some other type of coolant material. Two pipes 32 are shown in the vehicle 11 coupled to the connection pipe or coupling 33 and via that connection pipe to the compressor 34. Although the pipes are represented by single lines in the drawings, it will be appreciated that the fluid flow path also may include a return fluid flow path returning to the compressor 34 to prepare the fluid for delivery back to the pipes 32.

A valve V designated by reference numeral 35 may be provided in the fluid flow path and/or return fluid flow path to control flow of fluid therein, e.g., to increase or to decrease flow and thereby to increase or to decrease the radiant cooling. The valve V may be adjusted manually or by the control 30. In the latter case, the valve V may be an electrically responsive valve that receives inputs from the control 30 to adjust the fluid flow. Such inputs may be provided automatically by the control 30 to try to maintain a given temperature or amount of radiant cooling or may be provided manually as an input provided by the vehicle operator or passenger.

Power to the control 30 and to other electrical parts of the system 10 may be provided from the vehicle battery 24 via an electrical connection 36.

The chilled fluid or fluid that is intended to provide a radiant cooling effect in the vehicle 11 is provided from the compressor 34, via the connection pipe 33 to the radiant coolant pipe(s) 32. A pump (not shown) may pump the fluid through the pipe(s) 32 and back to the compressor; the pump may be part of the compressor. Cooling is provided passengers in the vehicle and also cools the compartment 22 in response to the cool fluid in the pipe 32 that radiates cooling affect. Although only two pipes 32 are shown, there may be more than two. The cooling pipes 32 may include heat exchange fins or the like to enhance the radiating of cooling into the compartment 22.

In the above description reference to an area in the compartment 22 includes not only a two dimensional area but also the three dimensional volume or space in the compartment. Thus, the terms area, space, and volume may be used synonymously herein.

The radiant heating portion 20h and radiant cooling portion 20c are shown exposed in the compartment 22. However, it will be appreciated that one or both of them may be in one or more walls, ceiling, front, back, and/or floor of the vehicle to provide heat or cooling to the wall(s), ceiling, front, back, and/or floor from which the heating and/or cooling is provided the compartment and persons therein. Also, insulation may be provided between the radiant heating or cooling portion 20h, 20c and the outside wall of the vehicle, and, if desired, reflectors may be provided to enhance heating and/or cooling effect, e.g., being provided between the outside wall of the vehicle and the insulation and/or between the insulation and the heating or cooling portion 20h, 20c.

With reference to the vehicle 11, it is noted that there is a steering wheel 40 and steering column 41 for the operator of the vehicle to steer the vehicle. Other suitable controls may be provided for the vehicle, such as, for example, an accelerator pedal, brake pedal, windshield wiper control, lights control, etc. as is conventional in automotive vehicles. The vehicle 11 may include a motive power source 42, such as, for example, a gasoline engine, diesel engine, or electric motor, that provides motive power to one or more of the vehicle wheels 43 to move the vehicle along a road, track, etc. The vehicle 11 also may include the battery 24 to provide electrical energy to respective electrical systems of the vehicle, to provide starting energy if the engine 42 is a gasoline or diesel engine, to operate the motor 42 if it is an electric motor, etc. The vehicle 11 also may include a radiator 44 for conventional purposes, such as, for example, to provide cooling for the engine 42. An alternator (not shown) may be used to recharge the battery 24, as is conventional.

In operation of the radiant system 10 of FIG. 1, for example, the user of the vehicle may adjust the control 30 to provide for heating the vehicle and/or persons in the vehicle. For example, the user may adjust the control 30 to provide radiant heat. In such case electrical energy is provided via electrical connection 21 to the radiant heat emitters 23. The emitters 23 radiate heat. In the illustration of FIG. 1 the emitters 23 include reflectors 23r (seen in FIG. 4) that are curved and are positioned at an angle, which may be adjustable, as desired, to direct and to reflect radiant heat from a heat radiating source of the emitter toward areas and/or to persons in the vehicle. For example, a heat radiating electrical wire, lamp, bulb, grid, gas burner, etc., may provide such radiant heat. The temperature sensor 31 may sense temperature in the compartment 22 and may provide an input to the control 30, which may operate automatically to tend to maintain a desired temperature in the compartment 22 in a conventional controlling manner, for example, as may be used in current automobiles and other vehicles, e.g., providing a thermostat type of function. A connection 36 from the vehicle battery 24 to the control 30 provides the source of electrical power, for example, to operate the control and to provide power via the electrical connector 21 to the radiant heat emitters 23.

Turning to FIG. 2A, the radiant system 10 includes radiant wires 25. The radiant wires may be electric resistance wires that radiate heat energy when receiving an electrical input from the electrical connection 21, control, 30, connection 36, and battery or other electrical power source 24. Although the wires 25 are shown as single dash lines, it will be appreciated that the wires may be one or several wires, a grid of electrical conductors, e.g., wires, etc. The radiant wires 25 and radiant heat emitters 23 may be other types of devices that emit radiant heat, e.g., infrared energy. An example is a solid state device that emits heat in response to receiving an electrical input.

In FIG. 2A the radiant cooling is provided using one or more cooling plates 60. The cooling plate(s) may be solid state devices or other devices that radiate cooling, e.g., of a type used in some refrigeration systems. For example, the cooling plate(s) may be one or more solid state devices that provide cooling effect, e.g., radiate cooling or absorb heat, in response to electrical energization. The radiant cooler may be a semiconductor cooling device. As is illustrated in FIG. 2A electrical energy from the battery 24 may be provided via the connection 36 to the control 30 and from the control to the respective cooling plates 60. The cooling, e.g., temperature in the compartment 22, may be automatically controlled by the control 30 in response to a setting of a desired temperature by the user compared to sensed temperature by temperature sensor 31 or by another thermostat type device.

If desired, as is shown in FIG. 2A, the cooling plates 60 may be coupled via a connection 33 to a compressor 34 (FIG. 1) to receive coolant, refrigerant, cooling liquid, etc., as was described above with respect to the cooling tubes 32 shown in FIG. 1.

FIG. 2B illustrates a radiant system 10 that uses heated fluid from the engine 42 or radiator 44 of the vehicle to provide a source of heated fluid as an energy input to a heat radiating plate or container 61 to radiate heat in the compartment 22, e.g., similar to the cooling plate 60 of FIG. 2A.

Briefly referring to FIGS. 3, 4 and 5, radiant systems 10, for example of the types shown in FIGS. 1 and 2, or other types, are illustrated, respectively, in a train car vehicle 13, aircraft 14 and watercraft 15. A separate radiant system 10 may be provided for each compartment of the vehicle. Alternatively, there may be several radiant systems 10 in each compartment. As another alternative, the radiant system 10 may be provided for several compartments of the vehicle, e.g., the pilot area compartment and the passenger area compartment of an aircraft, etc. For example, each passenger (person) may have independent controls that the passenger can operate. As still another alternative, a single radiant system 10 may be provided for several compartments and/or for several vehicles, e.g., for several train cars.

A method of using a radiant system 10 or other radiant system to provide radiant heating and/or cooling in a vehicle 11 may include, for example, providing appropriate energy to a radiant energy radiating or emitting device to provide heating or cooling effect by radiating heat or radiating cooling. The energy providing step may be providing electrical energy to a radiant heating device or to a radiant cooling device. The energy providing step may be providing warm fluid to a heat radiating device. The energy providing step may be providing chilled fluid, refrigerant, expansible (expandable) to cool fluid, phase change fluid, etc., to a cooling radiating device. Further, if desired, a thermostatic control step may include sensing temperature and turning on, turning off, increasing, or decreasing the heat radiating or cooling radiating.

Figure 6:
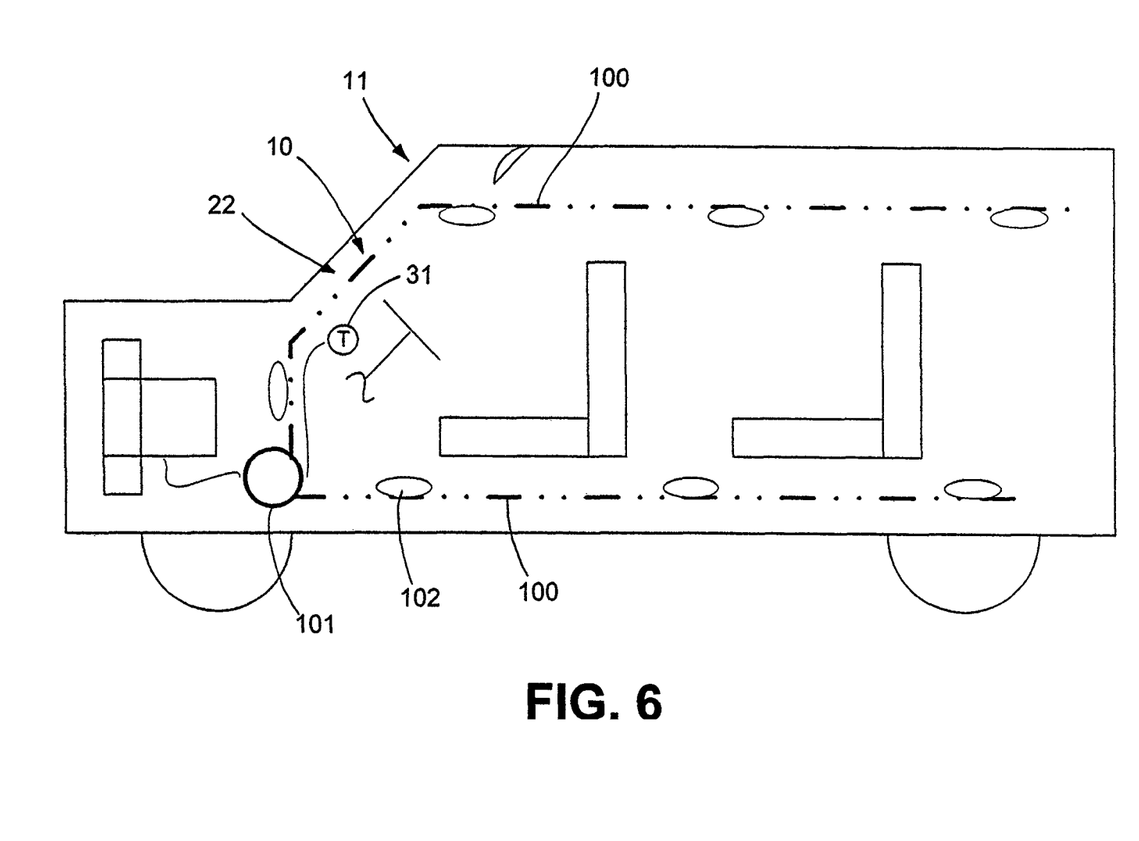
FIG. 6 is a schematic illustration of a heating and/or cooling system for a vehicle using slow air flow.

Turning briefly to FIG. 6, a heating and/or cooling system and method for a vehicle is illustrated. There is a flow system 100 for delivering heating and/or cooling air flow into the passenger compartment 22 or elsewhere. A blower 101 blows air via the flow system. The blower may include a mechanism for heating or cooling the air or may be coupled to receive or to provide heated or cooled air from another source. Exemplary outlets 102 are shown in the piping, ducts, etc. of the flow system 100 to allow air from the flow system to enter the compartment 22. A control in the blower or otherwise associated with the blower, e.g., the control 30 that is shown in other drawing figures, may include one or more temperature sensors 31, e.g., thermostats, thermocouple devices, bimetal devices, etc., to sense the temperature in the compartment 22 or at respective areas in the compartment 22 to provide an input to the control for use in automatically adjusting the operation of the blower 101 to turn it on and/or to control the temperature of the air being blown. The size of the flow system 100, e.g., the length, diameter, bends, etc. of piping, ducts and/or the like, making up the flow system may be coordinated with the blower 101 and the flow speeds and volumes provided by the blower so that air flow in the flow system and flowing into the compartment 22 does not make noise, e.g., is silent, or at least does not make substantial noise that would be disturbing to occupants therein, e.g., so that the noise does not detrimentally affect sound of speech, telephone communications, radio, etc.

It will be appreciated that air flow or other fluid flow systems for heating or cooling the vehicle, for example, the passenger compartment, etc., may be provided over a path and/or at a sufficiently slow flow rate to avoid causing or making disturbing noise in the vehicle. In embodiment the air flow is silent or substantially silent, and this can be achieved using a quiet blower, suitable insulation, controlled air flow rates, large air discharge openings, for example. Furthermore, as will be appreciated from the description elsewhere herein, radiant heating and cooling may be used to provide heating and cooling without noise, as there may be no need for a blower to blow air in the vehicle.

It will be appreciated that portions of the present invention, e.g., the control 30, can be implemented in hardware, software, firmware, or a combination thereof. In the described embodiment(s), a number of the steps or methods may be implemented in software or firmware that is stored in a memory and that is executed by a suitable instruction execution system. If implemented in hardware, for example, as in an alternative embodiment, implementation may be with any or a combination of the following technologies, which are all well known in the art: discrete logic circuit(s) having logic gates for implementing logic functions upon data signals, application specific integrated circuit(s) (ASIC) having appropriate combinational logic gates, programmable gate array(s) (PGA), field programmable gate array(s) (FPGA), etc.

Any process or method descriptions may be understood as representing modules, segments, or portions of code which include one or more executable instructions for implementing specific logical functions or steps in the process, and alternate implementations are included within the scope of the preferred embodiment of the present invention in which functions may be executed out of order from that discussed, including substantially concurrently or in reverse order, depending on the functionality involved, as would be understood by those reasonably skilled in the art of the present invention.

The above description and accompanying drawings depict the various features of the invention.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

Although certain embodiments have been shown and described, it is understood that equivalents and modifications falling within the scope of the appended claims will occur to others who are skilled in the art upon the reading and understanding of this specification.

What is claimed is:

1. A vehicle, comprising
   a passenger or user compartment of the vehicle,
   an electrical system of the vehicle, and
   wherein the vehicle includes an exclusive cooling system configured to provide cooling of the passenger or user, the exclusive cooling system comprising
      a radiant system built in as part of the vehicle and configured to provide the sole source of powered cooling of the passenger or user compartment and powered by the electrical system of the vehicle, wherein the radiant system is operative to provide effective cooling of the passenger or user compartment without liquid connection to the vehicle engine and without a blower blowing air into the passenger or user compartment transmitting energy by convection in the passenger or user compartment, and wherein the radiant system comprises a number of electrically energizable cooling devices configured to directly radiate cooling in the passenger or user compartment during traveling operation of the vehicle.

2. The vehicle of claim 1, wherein the radiant system further comprises an electrical radiant heater that is at least one of an infrared heater, an infrared energy emitting lamp, resistance heating wires, or infrared energy emitting wires configured to emit heat energy into the passenger or user compartment of the vehicle in response to electrical energization.

3. A vehicle, comprising
a passenger or user compartment of the vehicle,
an electrical system of the vehicle, and
a radiant system built in as part of a vehicle, powered by the electrical system of the vehicle and configured to provide both heating or cooling in and for the passenger or user compartment, wherein the radiant system is operative to provide effective heating and cooling of the passenger or user compartment without a blower blowing air into the passenger or user compartment transmitting energy by convection in the passenger or user compartment, wherein for cooling the radiant system is an exclusive cooling system configured to provide cooling of the passenger or user compartment, is the sole source of powered cooling of the passenger or user compartment and is powered by the electrical system of the vehicle, and wherein the radiant system comprises a number of solid state heaters, and wherein the radiant system comprises a number of solid state coolers, the solid state heaters and the solid state coolers being respectively energizable to radiate directly in the passenger or user compartment heating or cooling during traveling operation of the vehicle.

4. The vehicle of claim 1, wherein the cooling devices comprise solid state radiant cooling devices.

5. The vehicle of claim 2, further comprising a control configured to control heating or cooling by the radiant system.

6. The vehicle of claim 1, wherein the radiant system includes a radiant heating system to provide heating to the passenger or user compartment, and wherein the passenger or user compartment has a floor area, a ceiling area, and one or more doors, and at least part of the radiant system is at or in at least one of the ceiling area, wall, ceiling, front, back or one or more doors to provide heating or cooling.

7. The vehicle of claim 1, wherein the vehicle is at least one of an automotive vehicle, a train, a bus, an aircraft, or a watercraft.

8. A method of heating and cooling a passenger or user compartment in a vehicle that has an electrical system, a number of radiant heating devices, and an exclusive cooling system configured to provide the sole source of powered cooling of the passenger or user compartment by using a number of radiant cooling devices, comprising selectively energizing a number of the radiant heating devices to radiate heat in the passenger or user compartment when heating is desired or selectively energizing a number of the radiant cooling devices to radiate cooling in the passenger or user compartment when cooling is desired thereby selectively to provide both heating and cooling effect by directly radiating heat in the passenger or user compartment or directly radiating cooling in the passenger or user compartment, depending on whether heating or cooling in the vehicle, respectively, said radiating heat or radiating cooling comprising providing electrical energy from an electrical source of the vehicle to a number of the radiant heating devices or a number of the radiant cooling devices, respectively, so as to directly radiate heating or cooling in the passenger or user compartment of the vehicle in response to electrical energization without using a blower blowing air into the passenger or user compartment.

9. The method of claim 8, further comprising thermostatically controlling temperature in the vehicle, said thermostatically controlling temperature comprising sensing temperature in the vehicle, and turning on, turning off, increasing, or decreasing the heat radiating or cooling radiating.

10. The method of claim 8, wherein the providing heating or cooling effect comprises providing the same silently.

11. The method of claim 8, said radiating heat comprising electrically energizing and radiating heat from at least one of an electrical infrared heater, an infrared energy emitting lamp, resistance heating wires or infrared energy emitting wires to generate heat for heating in a compartment of the vehicle, and wherein said radiating heat or radiating cooling in the compartment of the vehicle in response to the provided electrical energy from an electrical source comprising providing such radiating as the sole source of heating or cooling, respectively, of the vehicle without transmitting energy by convection.

12. The vehicle of claim 1, wherein the radiant system is at least partly at or in at least two of the floor area, ceiling area, wall, ceiling, front, back or one or more doors to provide heating or cooling.

13. The method of claim 9, wherein said thermostatically controlling temperature is at least one of settable or be programmable by the vehicle operator, user or passenger to control the intensity of the radiant energy that is directed to one or more passengers in the vehicle to provide a desired temperature level.

14. The method of claim 8, wherein said controlling comprises operating separate controls to operate different respective radiant heat emitters so that individual passengers may control at least one of the temperature or intensity of radiant heat provided in the area where the respective passengers are located in the vehicle.

15. The method of claim 9, wherein said thermostatically controlling comprises providing control using one or more temperature sensors to sense the temperature in the compartment or at respective areas in the compartment to provide an input for automatically adjusting the operation of radiant heat emitters.

16. The vehicle of claim 1, wherein the cooling devices are distributed in the vehicle to provide radiant cooling in substantially the entire vehicle passenger or user compartment.

17. The vehicle of claim 3, wherein the solid state heaters and the solid state coolers are distributed in the vehicle to provide radiant heating and cooling in substantially the entire vehicle passenger or user compartment.

18. The method of claim 8, wherein the radiant heating devices and the radiant cooling devices are distributed in the vehicle passenger or user compartment, and wherein said providing of heating and cooling comprising providing heating and cooling, respectively, in substantially the entire vehicle passenger or user compartment.

* * * * *